US012688598B2

(12) United States Patent
Lim et al.

(10) Patent No.: US 12,688,598 B2
(45) Date of Patent: Jul. 21, 2026

(54) APPARATUS AND METHOD FOR OBJECT DETECTION

(71) Applicants: HYUNDAI MOTOR COMPANY, Seoul (KR); KIA CORPORATION, Seoul (KR)

(72) Inventors: Hyun Kyu Lim, Seoul (KR); Young Hyun Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 415 days.

(21) Appl. No.: 18/143,945

(22) Filed: May 5, 2023

(65) Prior Publication Data

US 2024/0193803 A1      Jun. 13, 2024

(30) Foreign Application Priority Data

Dec. 7, 2022    (KR) ........................ 10-2022-0169853

(51) Int. Cl.
 *G06T 7/70*          (2017.01)
 *G06T 7/50*          (2017.01)
  (Continued)

(52) U.S. Cl.
 CPC .................. *G06T 7/70* (2017.01); *G06T 7/50* (2017.01); *G06T 7/62* (2017.01); *G06V 10/25* (2022.01);
  (Continued)

(58) Field of Classification Search
 CPC ................ B60R 2300/301; G06T 7/50; G06T 2207/30252; G06T 5/50; G06T 2210/12;
  (Continued)

(56) References Cited

U.S. PATENT DOCUMENTS 10,936,922 B2    3/2021  Tariq et al.
10,937,178 B1 *  3/2021  Srinivasan .............. G06T 7/521
  (Continued)

FOREIGN PATENT DOCUMENTS

EP          3232371 A1    10/2017
KR        20200021626 A     3/2020

OTHER PUBLICATIONS

Habib, A., Kersting, A., & Bang, K. (Feb. 2010). Impact of LiDAR system calibration on the relative and absolute accuracy of the adjusted point cloud. In Proceedings of the International Calibration and Orientation Workshop EuroCOW 2010 (vol. 38). (Year: 2010).*

(Continued)

*Primary Examiner* — Chan S Park
*Assistant Examiner* — Chandhana Pedapati
(74) *Attorney, Agent, or Firm* — Lempia Summerfield Katz LLC

(57) ABSTRACT

An object detection apparatus includes a sensor device and a processor. The sensor device obtains an image. The processor obtains a first bounding box and a second bounding box based on a learning result of the image, calculates a two-dimensional overlapping degree between the first bounding box and the second bounding box, calculates a depth deviation between the first bounding box and the second bounding box, calculates a three-dimensional overlapping degree by reflecting the depth deviation to the two-dimensional overlapping degree, and performs a non-maximum suppression procedure based on the three-dimensional overlapping degree.

18 Claims, 14 Drawing Sheets

(51) Int. Cl.
    *G06T 7/62*         (2017.01)
    *G06V 10/25*       (2022.01)
    *G06V 10/74*       (2022.01)

(52) U.S. Cl.
    CPC .. *G06V 10/761* (2022.01); *G06T 2207/30252*
                                         (2013.01)

(58) Field of Classification Search
    CPC ... G06T 7/70; G06T 7/62; G06T 2207/20084;
               G06T 2207/20081; G06V 20/58; G06V
                            10/25; G06V 20/64
    See application file for complete search history.

(56)             References Cited

U.S. PATENT DOCUMENTS

| | | | |
|---|---|---|---|
| 11,450,063 B2 | 9/2022 | Choi | |
| 2018/0373942 A1* | 12/2018 | Noda | G06N 3/02 |
| 2019/0096086 A1* | 3/2019 | Xu | G06T 7/60 |
| 2020/0066036 A1 | 2/2020 | Choi | |
| 2020/0294257 A1 | 9/2020 | Yoo et al. | |
| 2021/0181351 A1 | 6/2021 | Ge et al. | |
| 2021/0237761 A1* | 8/2021 | Das | G01S 13/867 |
| 2022/0083789 A1 | 3/2022 | Zhou et al. | |
| 2022/0222889 A1* | 7/2022 | Bhargava | G06N 3/04 |
| 2024/0005632 A1* | 1/2024 | Ko | G06T 7/70 |

OTHER PUBLICATIONS

Z. Zhai, S. Sun and J. Liu, "Tracking Planar Objects by Segment Pixels," 2021 3rd International Academic Exchange Conference on Science and Technology Innovation (IAECST), Guangzhou, China, 2021, pp. 308-311, doi: 10.1109/IAECST54258.2021.9695632. (Year: 2021).*

* cited by examiner

Abox_1 Abox_2 Abox_k

IMG 1 y x

: Bbox

Bbox 2    Bbox 1

START

OBTAIN DEPTH DEVIATION BY
CALCULATING DIFFERENCE
BETWEEN FIRST DEPTH VALUE
AND SECOND DEPTH VALUE ——S810

CALCULATE AVERAGE DEPTH VALUE
OF EACH OF BOUNDING BOX TYPES ——S820

CALCULATE MAXIMUM DEVIATION
OF AVERAGE DEPTH VALUE SIZES ——S830

CALCULATE AND NORMALIZE
DEPTH DEVIATION AGAINST
MAXIMUM DEVIATION ——S840

END

☐ : Bbox 1   ☐ : Bbox 2   ☐ : Bbox 3

APPARATUS AND METHOD FOR OBJECT DETECTION

CROSS-REFERENCE TO RELATED APPLICATION

This application claims the benefit of priority to Korean Application No. 10-2022-0169853, filed in the Korean Patent Intellectual Property Office on Dec. 7, 2022, the entire contents of which are incorporated herein by reference.

TECHNICAL FIELD

The present disclosure relates to an apparatus and a method for object detection, and more particularly, relates to a technique for detecting an object using a non-maximum suppression method.

BACKGROUND

Vehicles may be classified into internal combustion engine vehicles, external combustion engine vehicles, gas turbine vehicles, electric vehicles, and the like, depending on the type of prime mover used.

An autonomous vehicle refers to a vehicle that can operate on its own without driver or passenger operation. Automated Vehicle & Highway System refers to a system that monitors and controls autonomous vehicles such that the autonomous vehicles can operate on their own.

In addition to autonomous vehicles, technologies for monitoring the outside of the vehicle and operating various driving assistance devices based on the monitored external environment of the vehicle have been proposed to assist the driver in driving. Accordingly, the importance of accuracy in monitoring objects outside a vehicle is increasing.

To detect objects outside a vehicle, an artificial intelligence learning method for an image outside the vehicle is being used. In the process of machine learning an image, a network for artificial intelligence learning outputs an enormous number of object candidates. A method of selecting an object from among the object candidates is also used.

In this way, in the process of selecting an object among object candidates, two-dimensional information or three-dimensional information of object candidates is used. However, a conventional method has a disadvantage in that the accuracy of object selection is low or the computational complexity of the object selection procedure is high.

SUMMARY

The present disclosure has been made to solve the above-mentioned problems occurring in the prior art while advantages achieved by the prior art are maintained intact.

Aspects of the present disclosure provide an object detection apparatus and an object detection method capable of increasing the accuracy of object selection.

In addition, aspects of the present disclosure provide an object detection apparatus and an object detection method capable of selecting an object with high accuracy while reducing the amount of computation in the object selection process.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an object detection apparatus includes a sensor device and a processor. The sensor device obtains an image. The processor obtains a first bounding box and a second bounding box based on a learning result of the image. The processor also calculates a two-dimensional overlapping degree of between the first bounding box and the second bounding box. The processor also calculates a depth deviation between the first bounding box and the second bounding box. The processor also calculates a three-dimensional overlapping degree by reflecting the depth deviation to the two-dimensional overlapping degree. The processor also performs a non-maximum suppression procedure based on the three-dimensional overlapping degree.

According to an embodiment, the processor may select the first bounding box and second bounding box within output values of a network using an anchor box corresponding to two or more vehicle sizes.

According to an embodiment, the processor may calculate the two-dimensional overlapping degree of between the first bounding box and the second bounding box. The processor may also determine a two-dimensional region of the first bounding box and a two-dimensional region of the second bounding box on an x-y plane of an input image. The processor may also calculate an overlapping degree between the two-dimensional region of the first bounding box and the two-dimensional region of the second bounding box.

According to an embodiment, the processor may obtain the depth deviation by calculating a difference in coordinate values on a z-axis between a reference point of the first bounding box and a reference point of the second bounding box on a bird's eye view of the image including the z-axis perpendicular to the x-y plane.

According to an embodiment, the processor may calculate the three-dimensional overlapping degree based on an absolute value of the depth deviation.

According to an embodiment, the processor may normalize the depth deviation within a range greater than 0 and less than 1, based on a ratio of the depth deviation to a maximum deviation of a depth value.

According to an embodiment, the processor may calculate an average depth value for each type of the anchor box. The processor may also obtain a maximum deviation of the depth value by calculating a difference between a maximum value of the average depth value and a minimum value of the average depth value.

According to an embodiment, the processor may set a size of the three-dimensional overlapping degree to be small in inverse proportion to the depth deviation.

According to an embodiment, the processor may obtain a normalization factor by calculating a difference between "1" and a normalized depth deviation. The processor may also obtain the three-dimensional overlapping degree by performing a multiplication operation between the two-dimensional overlapping degree and the normalization factor.

According to an embodiment, the processor may exclude a bounding box having a low confidence among the first bounding box and the second bounding box from an object candidate group when the three-dimensional overlapping degree is equal to or greater than a preset threshold value.

According to an aspect of the present disclosure, an object detection method includes obtaining a first bounding box and a second bounding box based on a learning result of an input image and calculating a two-dimensional overlapping degree between the first bounding box and the second bounding box. The method also includes calculating a depth deviation between the first bounding box and the second bounding box. The method also includes calculating a three-dimensional overlapping degree by reflecting the depth deviation to the two-dimensional overlapping degree. The method also includes performing a non-maximum suppression procedure based on the three-dimensional overlapping degree.

According to an embodiment, obtaining the first bounding box and the second bounding box may include selecting a pair of bounding boxes within output values of a network using an anchor box corresponding to two or more vehicle sizes.

According to an embodiment, the input image may include a plane defined by an x-axis and a y-axis. Calculating the two-dimensional overlapping degree between the first bounding box and the second bounding box may include determining a two-dimensional region of the first bounding box and a two-dimensional region of the second bounding box on an x-y plane. Calculating the two-dimensional overlapping degree between the first bounding box and the second bounding box may also include calculating an overlapping degree between the two-dimensional region of the first bounding box and the two-dimensional region of the second bounding box.

According to an embodiment, calculating the depth deviation may include obtaining the depth deviation by calculating a difference in coordinate values on a z-axis between a reference point of the first bounding box and a reference point of the second bounding box on a bird's eye view of the input image.

According to an embodiment, obtaining the depth deviation may further include obtaining an absolute value of the depth deviation.

According to an embodiment, obtaining the depth deviation may further include normalizing the depth deviation within a range greater than 0 and less than 1, based on a ratio of the depth deviation to a maximum deviation of a depth value.

According to an embodiment, obtaining the depth deviation may further include calculating an average depth value for each of types of the anchor box. Obtaining the depth deviation may further include obtaining a maximum deviation of the depth value by calculating a difference between a maximum value of the average depth value and a minimum value of the average depth value.

According to an embodiment, calculating the three-dimensional overlapping degree may include setting a size of the three-dimensional overlapping degree to be small in inverse proportion to the depth deviation.

According to an embodiment, calculating the three-dimensional overlapping degree may include obtaining a normalization factor by calculating a difference between "1" and the normalized depth deviation. Calculating the three-dimensional overlapping degree may also include obtaining the three-dimensional overlapping degree by performing a multiplication operation between the two-dimensional overlapping degree and the normalization factor.

According to an embodiment, performing the non-maximum suppression procedure may include excluding a bounding box having a low confidence among the first bounding box and the second bounding box from an object candidate group when the three-dimensional overlapping degree is equal to or greater than a preset threshold value.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
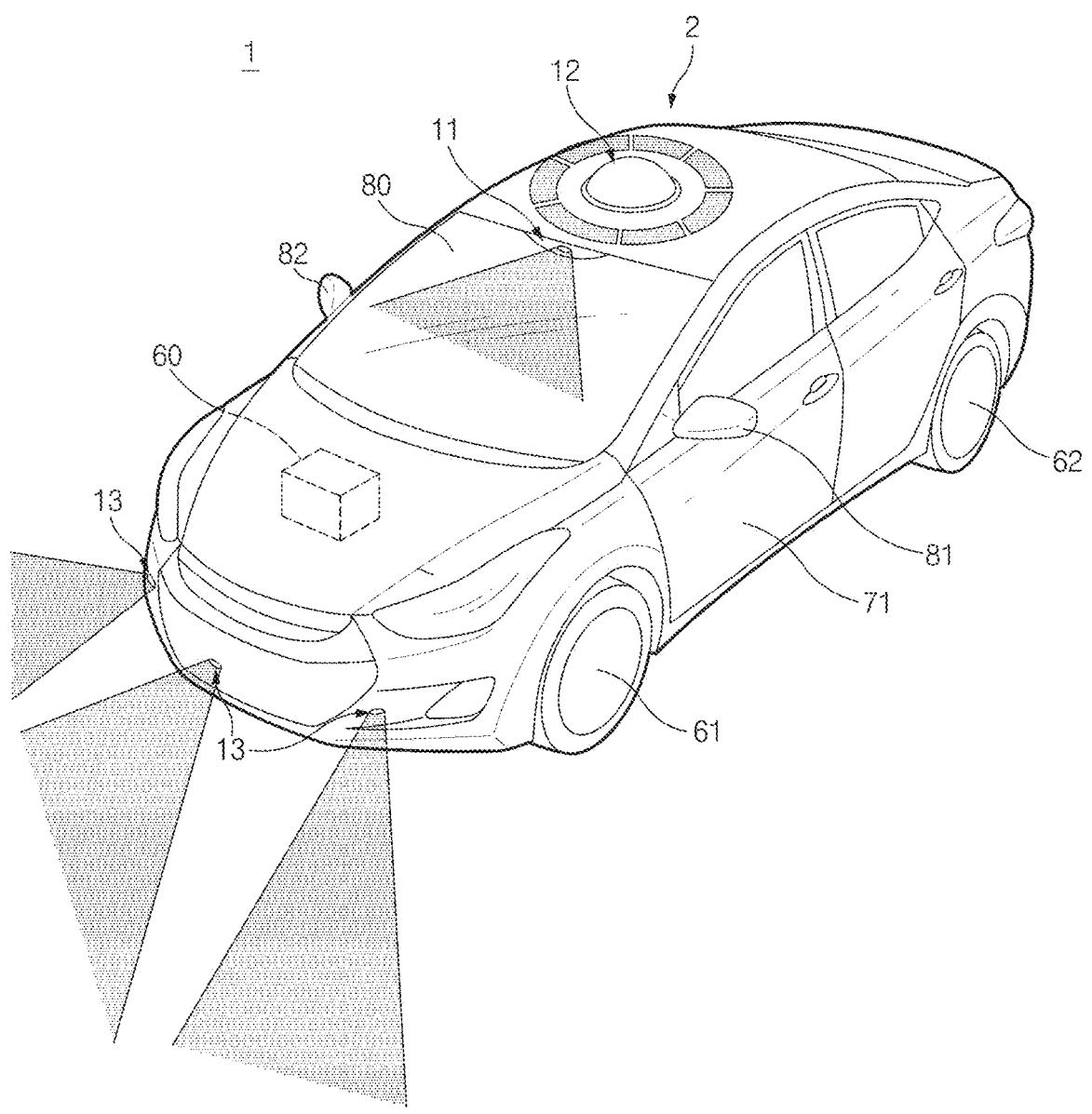
FIG. 1 is a diagram illustrating a vehicle including an object tracking apparatus, according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when the components are displayed on other drawings. Further, in describing the embodiments of the present disclosure, a detailed description of the related known configurations or functions have been omitted where it has been determined that the related known configurations or functions would interfere with understanding the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein. When a component, device, element, or the like of the present disclosure is described as having a purpose or performing an operation, function, or the like, the component, device, or element should be considered herein as being "configured to" meet that purpose or to perform that operation or function. Each of the component, device, element, and the like may separately embody or be included with a processor and a memory, such as a non-transitory computer readable media, as part of the apparatus.

Hereinafter, embodiments of the present disclosure are described in detail with reference to FIGS. 1-14.

FIG. 1 is a diagram illustrating a vehicle including an object tracking apparatus, according to an embodiment of the present disclosure.

Referring to FIG. 1, a vehicle 1 according to an embodiment of the present disclosure may include a main body 2 forming an exterior, wheels 61 and 62 for moving the vehicle 1, a driving device 60 for rotating the wheels 61 and 62, a door 71 shielding the inside of the vehicle 1 from the outside, a windshield 80 providing a front view of the vehicle 1 to a user inside the vehicle 1, and side mirrors 81 and 82 providing a side view and/or a rear view.

The wheels 61 and 62 may include a front wheel 61 provided at the front of the vehicle and a rear wheel 62 provided at the rear of the vehicle. The driving device 60 may provide rotational force to the front wheel 61 or the rear wheel 62 such that the body 2 moves forward or backward.

The door 71 is rotatably provided on the left and right sides of the body 2 such that an occupant can get in the inside of the vehicle 1 when the door 71 is opened and the inside of the vehicle 1 can be shielded from the outside when the door 71 is closed.

The windshield 80, which is a type of wind screen, may be provided on the front upper side of the body 2 to provide information about the view of the front of the vehicle 1 to a driver or user inside the vehicle 1.

The side mirrors 81 and 82 may include a left side mirror 81 provided on the left side of the body 2 and a right side mirror 82 provided on the right side of the body 2 and may provide the driver inside the vehicle 1 with side and rear view information of the vehicle 1.

The vehicle 1 may be an electrification-based vehicle such as an electric vehicle (EV), a hybrid electric vehicle (HEV), a plug-in hybrid electric vehicle (PHEV), a fuel cell electric vehicle (FCEV), or the like. In the case of the electrification-based vehicle, the driving device 60 may be a driving motor.

Figure 2:
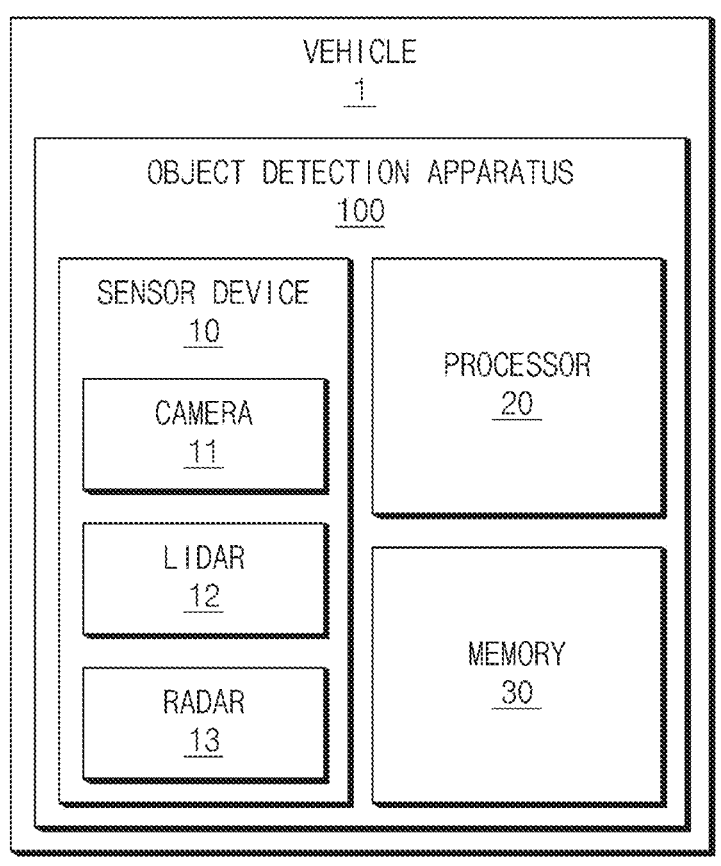
FIG. 2 is a block diagram illustrating a configuration of an object detection apparatus, according to an embodiment of the present disclosure.

FIG. 2 is a block diagram illustrating a configuration of an object detection apparatus, according to an embodiment of the present disclosure.

Referring to FIG. 2, an object detection apparatus 100 according to an embodiment of the present disclosure may include a sensor device 10, a processor 20, and a memory 30.

The sensor device 10 is for acquiring sensing data for extracting objects around the vehicle 1 and may include a camera 11, a lidar 12, and/or a radar 13. Positions in which the camera 11, the lidar 12, and the radar 13 are disposed on the vehicle 1 may not be limited to FIG. 1.

The camera 11 may obtain image data based on sensing light in the visible ray region from the front of the vehicle 1.

The lidar 12 may emit a laser pulse and determine an object by measuring a time at which the emitted laser pulse is reflected. The lidar 12 may provide three-dimensional information.

The radar 13 may analyze an object by transmitting electromagnetic waves and analyzing returned electromagnetic waves. The radar 13 may provide two-dimensional information and may quickly provide information associated with an object.

The processor 20 may detect an object based on sensing data acquired by the sensor device 10.

The processor 20 may obtain first and second bounding boxes based on a learning result of the input image. The first and second bounding boxes are based on a learning result of a deep learning network and may represent a region predicted as an object.

Also, the processor 20 may calculate a two-dimensional overlapping degree between the first bounding box and the second bounding box. The two-dimensional overlapping degree may use an Intersection Over Union (IOU) method.

Also, the processor 20 may calculate a depth deviation between the first bounding box and the second bounding box. The depth deviation may mean a depth deviation in a direction perpendicular to a plane of the input image.

In addition, the processor 20 may calculate a three-dimensional overlapping degree by reflecting the depth deviation to the two-dimensional overlapping degree.

Also, the processor 20 may perform a Non-Maximum Suppression (NMS) procedure based on the three-dimensional overlapping degree.

The memory 30 may store algorithms for object detection. The object detection algorithms may be performed based on artificial intelligence. For this purpose, the processor 20 may include an artificial intelligence (hereinafter referred to as AI) processor. The AI processor may train a neural network using a pre-stored program. The neural network may be designed to simulate the structure of the human brain on a computer and may include a plurality of network nodes having weights that simulate neurons of the human neural network. The plurality of network nodes may transmit and receive data according to a connection relationship, respectively, so as to simulate synaptic activity of neurons that transmit and receive signals through synapses. The neural network may include a deep learning model developed from a neural network model. In the deep learning model, a plurality of network nodes may exchange data according to a convolution connection relationship while being located in different layers. Examples of neural network models may include various deep learning techniques, such as deep neural networks (DNN), convolutional deep neural networks (CNN), recurrent Boltzmann machine (RNN), restricted Boltzmann machine (RBM), deep trust deep belief networks (DBN), and deep Q-networks.

The memory 30 may be included in the processor 20 or may be provided separately. Accordingly, the memory 30 may be configured as a combination of a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double data rate-SDRAM (DDR-SDRAM), and the like.

Figure 3:
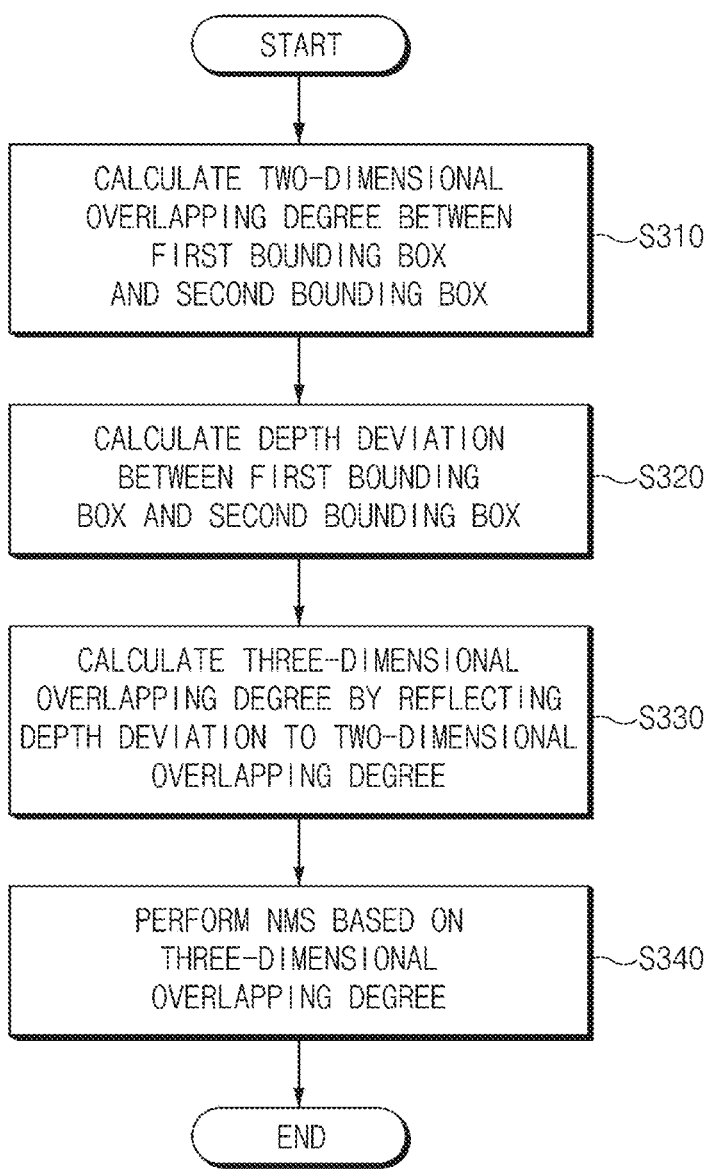
FIG. 3 is a flowchart illustrating an object detection method, according to an embodiment of the present disclosure.

FIG. 3 is a flowchart illustrating an object detection method, according to an embodiment of the present disclosure. FIG. 3 may represent procedures performed by the processor 20.

Referring to FIG. 3, an object detection method according to an embodiment of the present disclosure is as follows.

In S310, the processor 20 may calculate a two-dimensional overlapping degree between the first bounding box and the second bounding box. The first bounding box and the second bounding box may be obtained based on a learning result of the input image.

In S320, the processor 20 may calculate a depth deviation between the first bounding box and the second bounding box.

To this end, the processor 20 may calculate a first depth value of the first bounding box and a second depth value of the second bounding box. The processor 20 may calculate a depth deviation by calculating a difference between the first depth value and the second depth value. The depth deviation may be calculated as an absolute value.

In S330, the processor 20 may calculate a three-dimensional overlapping degree by reflecting the depth deviation to the two-dimensional overlapping degree.

The processor 20 may set the size of the three-dimensional overlapping degree to be small in inverse proportion to the depth deviation.

In S340, the processor 20 may perform the NMS based on the three-dimensional overlapping degree.

The processor 20 may exclude a bounding box having a low confidence among the first bounding box and the second bounding box from the object candidate group when the three-dimensional overlapping degree is greater than or equal to a preset threshold value.

Hereinafter, a detailed operation of the object detection method illustrated in FIG. 3 is described.

Figure 4:
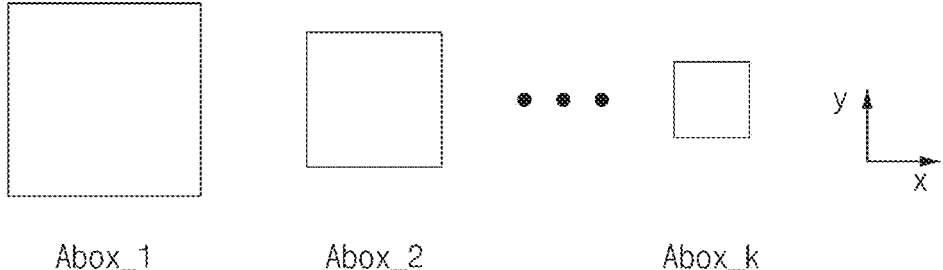
FIG. 4 is a diagram illustrating an anchor box, according to an embodiment of the present disclosure.
Figure 5:
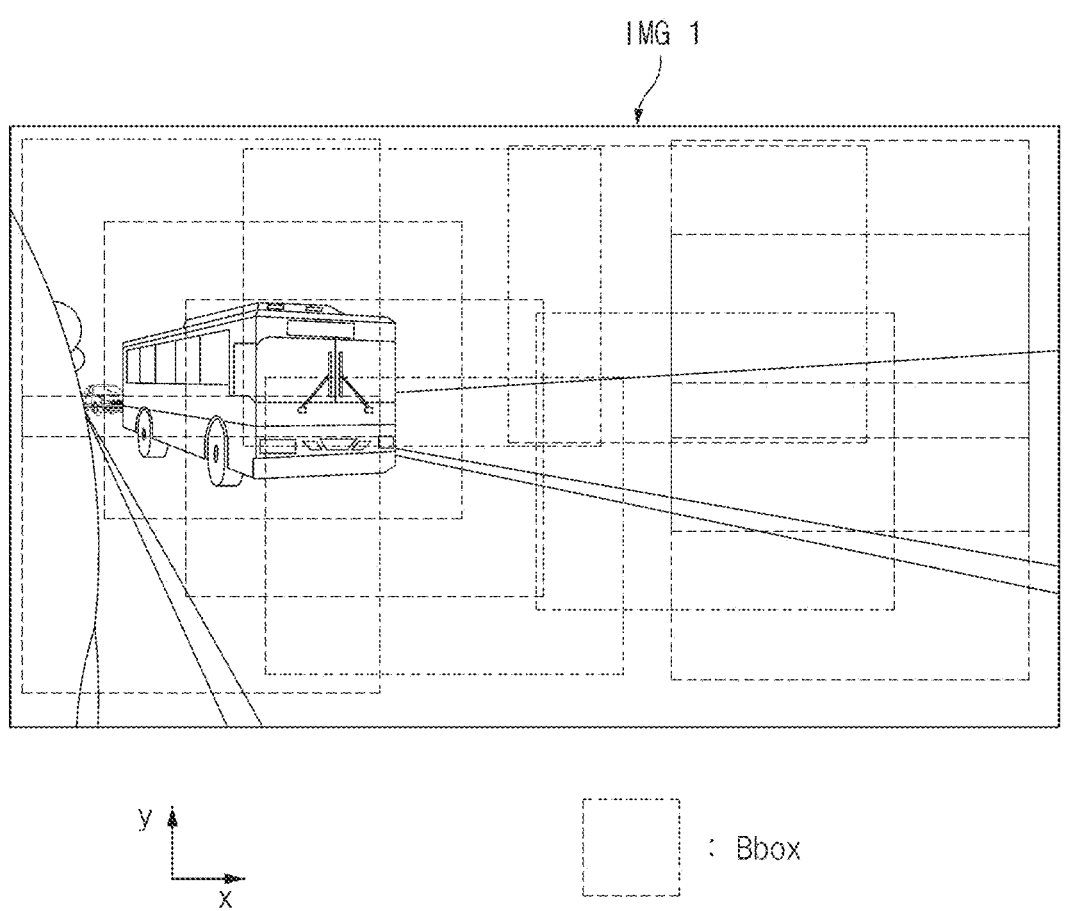
FIG. 5 is a schematic diagram illustrating an example of applying an anchor box to a two-dimensional image.
Figure 6:
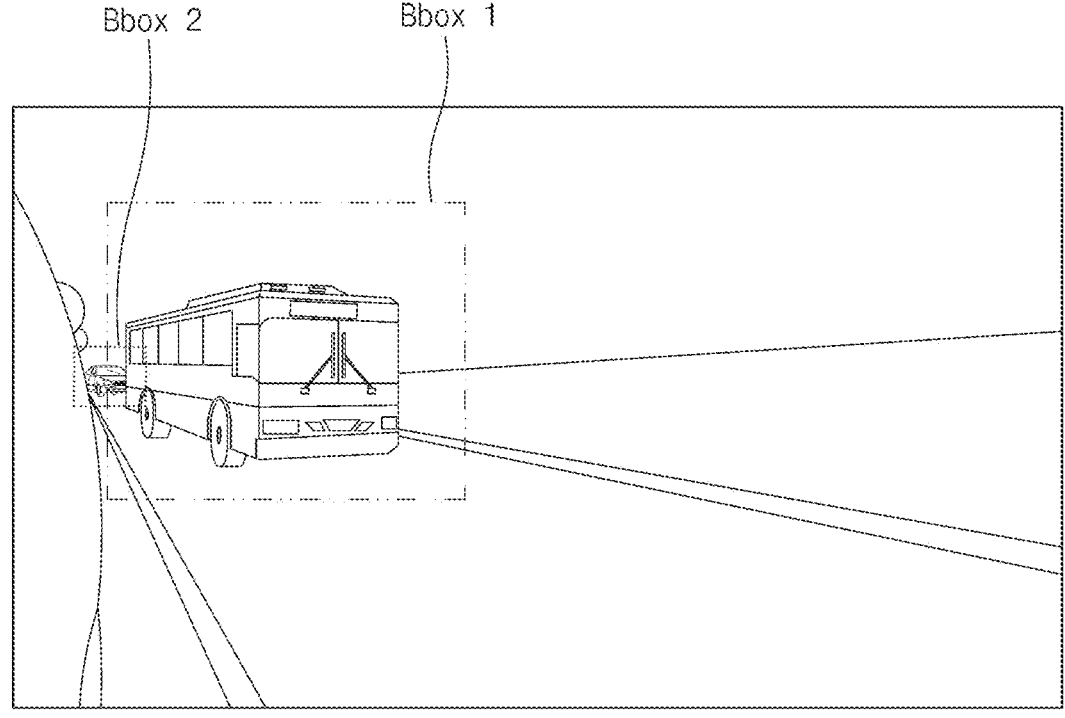
FIG. 6 is a diagram illustrating an example of a first bounding box and a second bounding box.

FIGS. 4-6 are diagrams for describing a method of obtaining a first bounding box and a second bounding box. The bounding boxes may be boxes in which the location of an object predicted by a deep learning network is indicated. The bounding boxes may be output values of the deep learning network. An anchor box may be provided as an input to the deep learning network to obtain the bounding boxes. Hereinafter, with reference to FIGS. 4-6, an embodiment of obtaining a first bounding box and a second bounding box is described.

FIG. 4 is a diagram illustrating an anchor box, according to an embodiment of the present disclosure. FIG. 5 is a schematic diagram illustrating an example of applying an anchor box to a two-dimensional image.

Referring to FIGS. 4 and 5, anchor boxes (Abox_1, Abox_2, and Abox_k) ('k' is a natural number) may be bounding boxes having predefined widths and heights and may be input values assuming a shape of an object to be detected by the network. In an embodiment of the present disclosure, the anchor box may be a box in which a width in an x-axis direction and a height in a z-axis direction are predefined. The anchor boxes may be defined to capture the size and aspect ratio of a specific object class and may be selected based on an object size in the training data set. For example, the first anchor box Abox_1 may be an anchor box for classifying large trucks, and the k-th anchor box Abox_k may be an anchor box for classifying light vehicles.

During deep learning, predefined anchor boxes may be arranged over the entire image region in checkerboard form. A position in which the anchor box is created in an image may be determined by a sampled feature map.

When a deep learning network is operated using the anchor box, objects of different sizes and overlapping objects may be detected.

To this end, the deep learning network may generate targets for learning based on anchor boxes. The target may be derived through an equation for each coordinate between the ground truth and the anchor box and may represent a relationship between the ground truth and the anchor box.

For example, an anchor box may be expressed as (Px, Py, Pw, and Ph). In this case, (Px, Py) is the center point of the anchor box, Pw means the width, and Ph means the height. In addition, the ground truth may be expressed as (Gx, Gy, Gw, and Gh). In this case, (Gx, Gy) is the center point of the anchor box, Gw means the width, and Gh means the height.

The goal of learning is to train a function that moves the anchor box as close as possible to the ground truth. The function may be expressed as $t_x(P)$, $t_y(P)$, $t_w(P)$, and $t_h(P)$.

Since 'x' and 'y' are points, only the position may be moved regardless of the image, and the width and height may be adjusted in proportion to the size of the image.

Therefore, the target function ($t_x$, $t_y$, $t_w$, and $t_h$) for moving the anchor box to the ground truth may be expressed as the following Equation 1.

$$t_x = \frac{(G_x - P_x)}{P_w} \qquad \text{Equation 1}$$

$$t_y = \frac{(G_y - P_y)}{P_h}$$

$$t_w = \log\left(\frac{G_w}{P_w}\right)$$

$$t_h = \log\left(\frac{G_h}{P_h}\right)$$

In addition, the deep learning network may generate a bounding box from the predicted target. In other words, linear regression that adjusts the bounding box by multiplying a vector extracted through the deep learning network by the weight of the function that adjusts the center point, width, and height may be trained.

In this way, the deep learning network may obtain the coordinates of the bounding box through the anchor box.

The bounding boxes obtained using the anchor box represent the position of the object predicted by the network and may include two-dimensional information and three-dimensional information.

The two-dimensional information of the bounding box may include information of the center coordinates of the bounding box and may include information of width and height of the bounding box. In the two-dimensional information, the center coordinates of the bounding box may be expressed as x and y coordinates, the width may mean the length of the bounding box on the x-axis, and the height may mean the length of the bounding box on the y-axis.

The three-dimensional information of the bounding box may include information of the center coordinates of the bounding box and may include information of width, height, and depth of the bounding box. In three-dimensional information, the center coordinates of the bounding box may be expressed as x, y, and z coordinates, the width may mean the length of the bounding box on the x-axis, the height may mean the length of the bounding box on the y-axis, and the depth may mean the length of the bounding box on the z-axis.

FIG. 6 is a diagram illustrating an example of a first bounding box and a second bounding box.

Referring to FIG. 6, a two-dimensional image IMG 1 obtained according to an embodiment of the present disclosure may be a surrounding image of a vehicle. A plane formed by two coordinate axes on a two-dimensional image may be a plane perpendicular to a road surface. For example, the x-axis is perpendicular to the traveling direction of the vehicle on the road surface, and the y-axis is an axis perpendicular to the road surface, which may be the height direction of the object.

The depth value may be a distance from the coordinate plane of the two-dimensional image IMG1 and may mean a coordinate value of the z-axis perpendicular to the x-y plane.

The first bounding box Bbox 1 and the second bounding box Bbox 2 may be boxes representing predictions that can be estimated as objects. The deep learning network may output more boxes than the number of actual objects.

Hereinafter, an embodiment of the present disclosure is described focusing on the first bounding box Bbox 1 and the second bounding box Bbox 2 among two or more prediction boxes.

Figure 7:
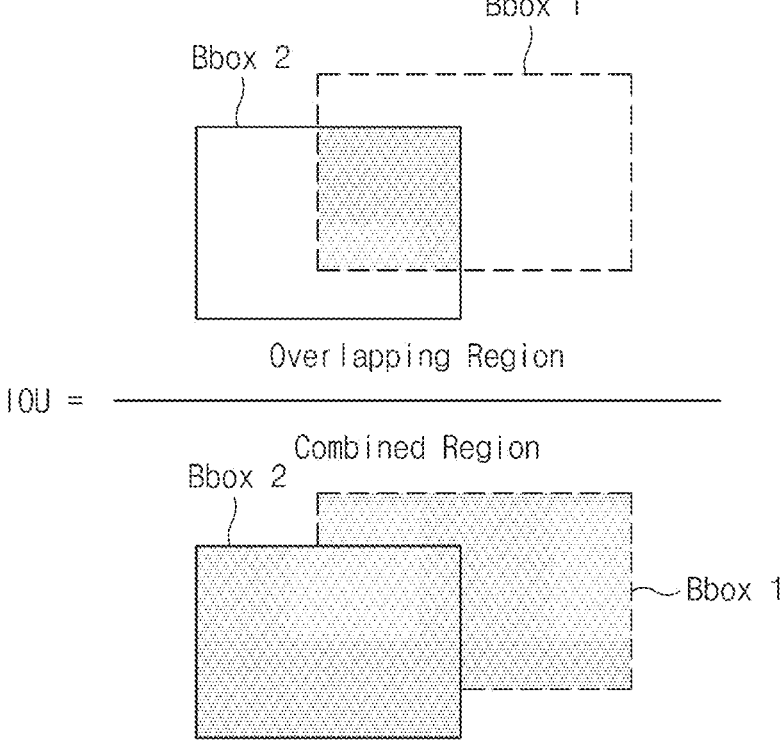
FIG. 7 is a schematic diagram for describing a method of calculating a two-dimensional overlapping degree, according to an embodiment of the present disclosure.

FIG. 7 is a schematic diagram describing a method of calculating a two-dimensional overlapping degree, according to an embodiment of the present disclosure.

Referring to FIG. 7, the overlapping degree between the first bounding box Bbox 1 and the second bounding box Bbox 2 may be obtained using an Intersection over Union (IoU) method.

The IoU may be calculated as the size of the intersection region between the first bounding box Bbox 1 and the second bounding boxes Bbox 2 compared to the total region size of the first bounding box Bbox 1 and the second bounding boxes Bbox 2. The IoU may be expressed as a numerical value greater than or equal to 0 (zero) and less than or equal to 1.

Figure 8:
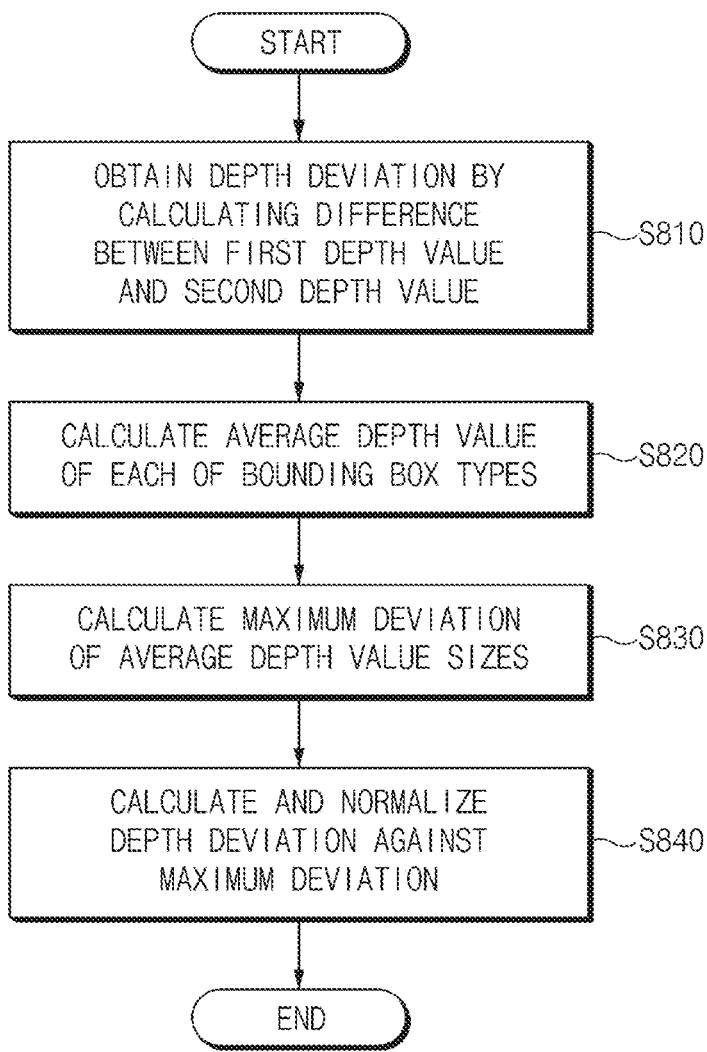
FIG. 8 is a flowchart illustrating a method of normalizing a depth deviation.

FIG. 8 is a flowchart illustrating a method of normalizing a depth deviation. FIG. 8 may be performed under the control of the processor illustrated in FIG. 2.

In operation S810, the processor 20 may obtain a depth deviation by calculating a difference between a first depth value of the first bounding box Bbox 1 and a second depth value of the second bounding box Bbox 2.

The S810 procedure is described in conjunction with FIGS. 9 and 10 as follows.

Figure 9:
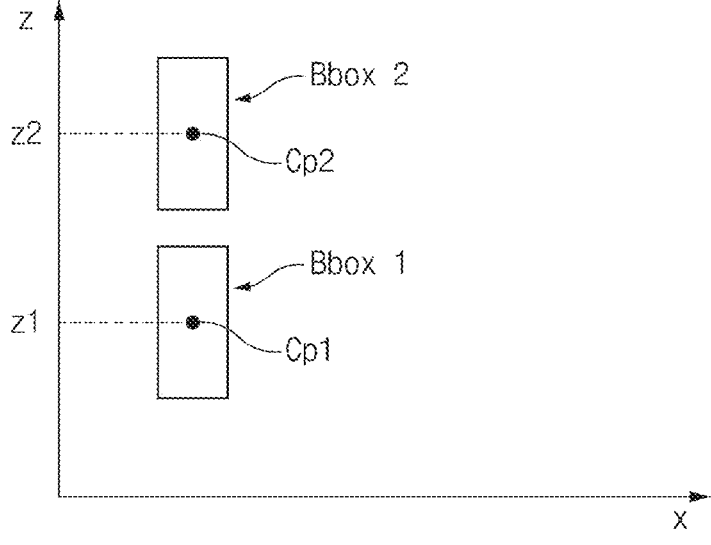
FIG. 9 is a diagram for describing a method of obtaining a depth value.
Figure 10:
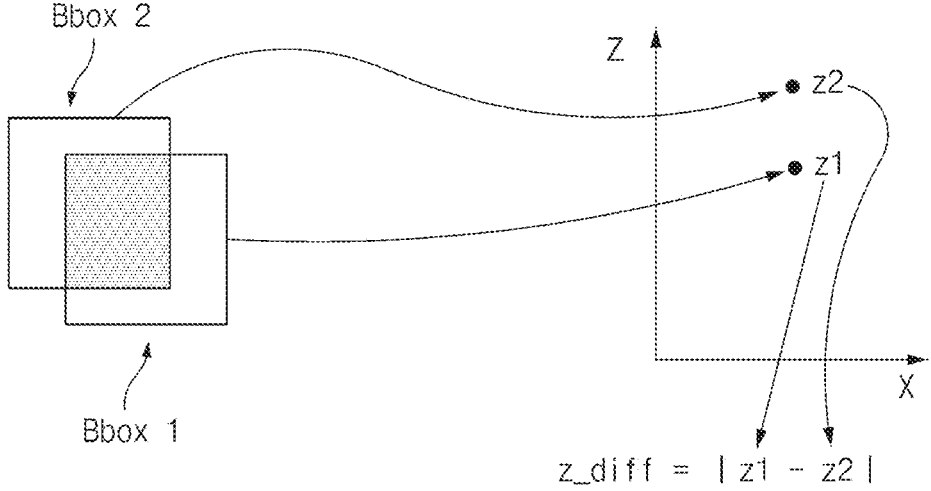
FIG. 10 is a diagram for describing a method of calculating a depth deviation.

FIG. 9 is a diagram for describing a method for obtaining a depth value and FIG. 10 is a diagram for describing a method for calculating a depth deviation. In other words, FIG. 9 illustrates a bird's eye view of the first bounding box Bbox 1 and the second bounding box Bbox 2 illustrated in FIG. 6. In FIGS. 9 and 10, the z-axis may be a coordinate axis perpendicular to the x-y plane.

Referring to FIG. 9, a first reference point Cp1 of the first bounding box Bbox 1 and a second reference point Cp2 of the second bounding box Bbox 2 may be preset points within the bounding box. For example, the reference point may be set to a center of the bounding box.

The depth values may be distances from the x-y plane illustrated in FIG. 6 and thus may correspond to coordinate values of the z-axis. In other words, the depth value of the first bounding box Bbox 1 may be obtained as "z1", and the depth value of the second bounding box Bbox 2 may be obtained as "z2".

Since a depth difference z_diff between the first depth value z1 and the second depth value z2 is for determining the separation distance between the first bounding box Bbox1 and the second bounding box Bbox 2, the depth deviation z_diff may be calculated considering only the deviation of the z-axis coordinate regardless of the x-axis coordinate. Therefore, the depth deviation z_diff may be obtained by calculating the absolute value of "z1−z2".

In S820, the processor 20 may calculate an average depth value of each of the bounding box types.

The S820 procedure is described with reference to FIG. 11 as follows.

Figure 11:
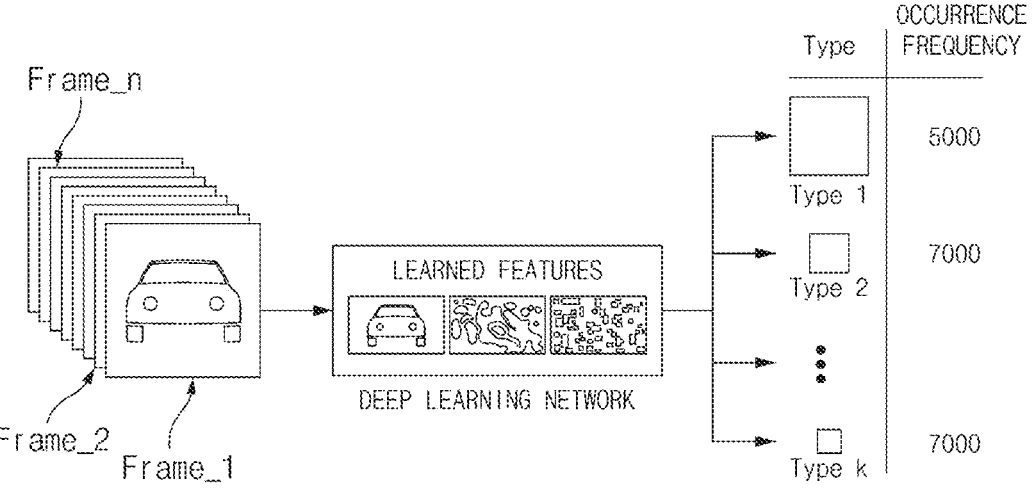
FIG. 11 is a diagram for describing a process of calculating an average depth value of each of bounding box types.

FIG. 11 is a diagram for describing a process of calculating an average depth value of each of bounding box types.

Referring to FIG. 11, the deep learning network may train n ('n' is a natural number) image frames and output bounding boxes. Each bounding box may be classified into a type corresponding to an anchor box. For example, Type 1 may mean the bounding box detected by the first anchor box Abox 1, Type 2 may mean the bounding box detected by the second anchor box Abox 2, and Type_k may mean the bounding box detected by the k-th anchor box Abox_k.

The processor 20 may calculate an occurrence frequency of each bounding box type. For example, FIG. 11 illustrates an example in which the occurrence frequency of Type 1 is 5000 times, the occurrence frequency of Type 2 is 7000 times, and the occurrence frequency of Type_k is 7000 times.

The processor 20 may calculate an average depth value of Type 1 by summing the depth values of each of the Type 1 bounding box types and dividing the summed result by 5000. As in the above description, the processor 20 may calculate an average depth value of each of all bounding box types. The average depth values calculated by the processor 20 may be expressed in Table 1 below.

TABLE 1

| Type | Type 1 | Type 2 | . . . | Type_k |
|------|--------|--------|-------|--------|
| z_avg | 90 | 30 | . . . | 10 |

In S830, the processor 20 may calculate the maximum deviation of the average depth values.

The processor 20 may calculate a difference between the maximum average depth value and the minimum average depth value to obtain the maximum deviation of the average depth value.

As in Table 1, when the average depth value of Type 1 is the maximum average depth value z_avg_max and the average depth value of Type_k is the minimum average depth value z_avg_min, the processor 20 may obtain the maximum deviation of the average depth value as 80.

In S840, the processor 20 may calculate and normalize the depth deviation against the maximum deviation.

In other words, the processor 20 may normalize the depth deviation z_diff between the first bounding box Bbox 1 and the second bounding box Bbox 2 based on the following Equation 2 to obtain the normalized depth deviation z_norm.

$$z\_norm = \frac{z\_diff}{z\_avg\_max - z\_avg\_min} \qquad \text{Equation 2}$$

By normalizing the depth deviation in this way, it is possible to obtain the depth deviation with a size of 0 or more and 1 or less, similar to the two-dimensional overlapping degree.

A method for obtaining a three-dimensional overlapping degree based on the normalized depth deviation is as follows.

The processor 20 may set the size of the three-dimensional overlapping degree to be small in inverse proportion to the depth deviation.

To this end, the processor 20 may calculate a normalization factor that is inversely proportional to the depth deviation. The processor 20 may obtain the normalization factor by calculating a difference between 1 and the normalized depth deviation z_norm. For example, when the normalized depth deviation z_norm is 0.2, the normalization factor may be obtained as 0.8.

The processor 20 may obtain a three-dimensional overlapping degree by multiplying the two-dimensional overlapping degree by a normalization factor. For example, when the two-dimensional overlapping degree is 0.8 and the normalization factor is 0.8, the three-dimensional overlapping degree may be obtained as 0.64.

The NMS procedure may compare the three-dimensional overlapping degree with a preset threshold value. When the three-dimensional overlapping degree is greater than or equal to the preset threshold value, a bounding box to be compared may be removed. According to an embodiment of the present disclosure, the three-dimensional overlapping degree may be lowered in inverse proportion to the size of the normalization factor. In other words, the three-dimensional overlapping degree may decrease in proportion to the size of the depth deviation.

As a result, according to an embodiment of the present disclosure, as the separation distance between the bounding boxes increases, the possibility of the bounding boxes being removed may decrease. Accordingly, even if the two-dimensional overlapping degree is high, when the bounding boxes are used to estimate distant objects, two bounding boxes may be left as an object candidate group.

Figure 12:
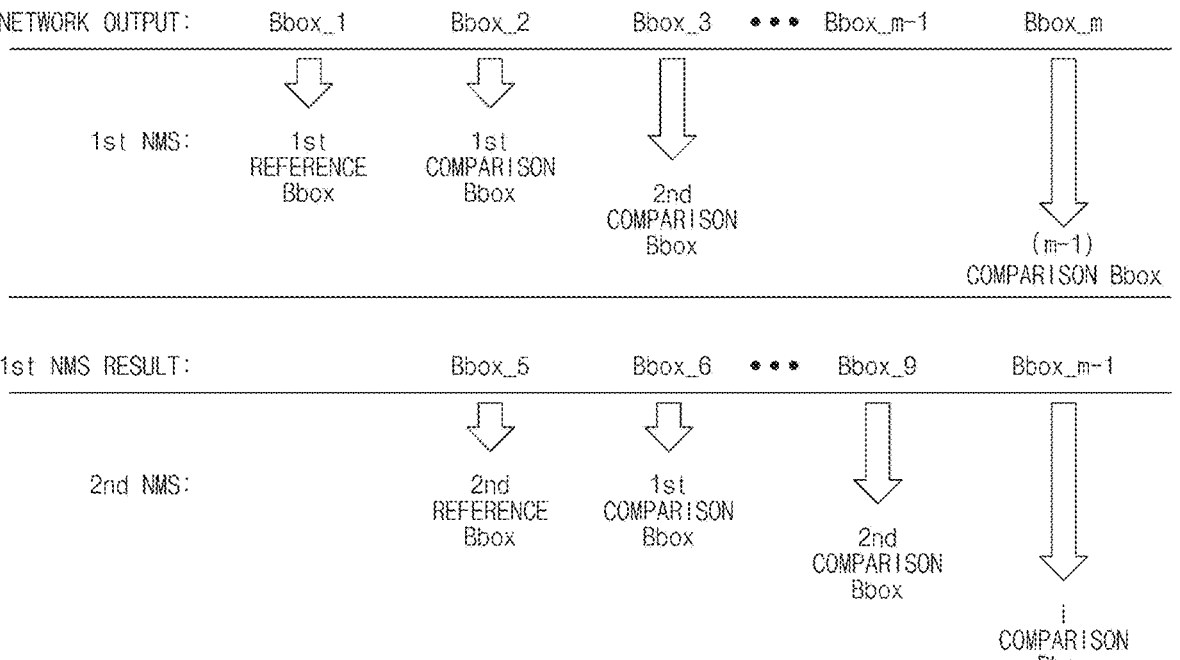
FIG. 12 is a diagram for describing a procedure for performing an NMS.

FIG. 12 is a diagram for describing a procedure for performing an NMS.

Referring to FIG. 12, an output of network learning may include a first bounding box Bbox 1 to m-th ('m' is a natural number) bounding boxes Bbox_m. The processor 20 may arrange m bounding boxes in descending order of confidence values. For example, FIG. 12 illustrates that the first bounding box Bbox 1 has the largest confidence, the second bounding box has the second largest confidence, and the m-th bounding box Bbox_m has the smallest confidence.

The processor 20 may perform NMS with respect to a first group including 'm' number of bounding boxes output by the network. The processor 20 may select the first bounding box Bbox 1 having the largest confidence as a reference bounding box. In addition, the processor 20 may determine m-1 number of bounding boxes other than the reference bounding box as comparison bounding boxes and may perform an NMS processing between the reference bounding box and the comparison bounding boxes. For example, the processor 20 may perform the NMS procedure between the first bounding box Bbox 1 and the second bounding box Bbox 2 and then may perform the NMS procedure between the first bounding box Bbox 1 and the third bounding box Bbox 3. Each NMS procedure may include procedures S310 to S340 illustrated in FIG. 3.

Also, the processor 20 may perform the NMS on the bounding boxes of the second group left by the NMS result of the first group. When a fifth bounding box Bbox 5 has the highest confidence among the second group of bounding boxes, the processor 20 may select the fifth bounding box Bbox 5 as a reference bounding box and may select other bounding boxes as the comparison bounding boxes. When the number of comparison bounding boxes excluding the fifth bounding box Bbox 5 is i ('i' is a natural number less than or equal to m-2), the NMS may be performed 'i' times with respect to the second group.

The NMS results according to an embodiment of the present disclosure and the NMS results according to a comparative example are as follows with reference to Table 2.

TABLE 2

| DIVISION | EMBODIMENT EMBODIMENT | COMPARISON EXAMPLE |
|---|---|---|
| TWO-DIMENSIONAL OVERLAPPING DEGREE | 0.8 | 0.8 |

TABLE 2-continued

| DIVISION | EMBODIMENT EMBODIMENT | COMPARISON EXAMPLE |
|---|---|---|
| Z_diff | 16 (m) | — |
| Z_norm | 0.2 | — |
| 1 − z_norm | 0.8 | — |
| THREE-DIMENSIONAL OVERLAPPING DEGREE | $0.8 \times 0.8 = 0.64$ | — |
| THRESHOLD VALUE: 0.7 | HOLD | REMOVE |

In the example of Table 2, the embodiment illustrates NMS results based on FIG. 3, and the comparative example illustrates conventional NMS results using only two-dimensional information. In addition, an embodiment according to the present disclosure and a comparison example according to a conventional method illustrate a case in which the two-dimensional overlapping degree between the reference bounding box and the comparison bounding box is 0.8.

In addition, the embodiment of the present disclosure illustrates a result that the depth deviation z_diff is 16 (m) and the normalization value of the depth deviation is 0.2. When the normalization value of the depth deviation is 0.2, the normalization factor may be obtained as 0.8. Thus, the three-dimensional overlapping degree may be obtained as 0.64.

When the threshold value is set to 0.7, the NMS result is as follows.

The NMS according to the comparison example may remove the comparison bounding box because the two-dimensional overlapping degree is greater than or equal to the threshold value.

In contrast, according to an embodiment of the present disclosure, since the three-dimensional overlapping degree is smaller than the threshold value, the comparison bounding box may be left.

For example, as illustrated in FIG. 6, even if the overlapping degree between the first bounding box Bbox1 and the second bounding box Bbox2 is greater than or equal to a threshold value, since the separation distances of the respective bounding boxes are far apart when the depth deviation between the first bounding box Bbox1 and the second bounding box Bbox2 is large, it is highly likely that the objects are different from each other. Therefore, according to an embodiment of the present disclosure, both objects corresponding to the first bounding box Bbox1 and the second bounding box Bbox2 illustrated in FIG. 6 may be detected.

In other words, since NMS is performed by fusing two-dimensional information and three-dimensional information according to an embodiment of the present disclosure, it is possible to simply detect an object that may be omitted according to the result of the determination based on the two-dimensional overlapping degree.

In addition, since the embodiment of the present disclosure uses only depth information in the process of fusing three-dimensional information, computational efficiency may be increased.

In addition, the embodiment of the present disclosure may expect the following effects compared to the conventional NMS using three-dimensional information.

Figure 13:
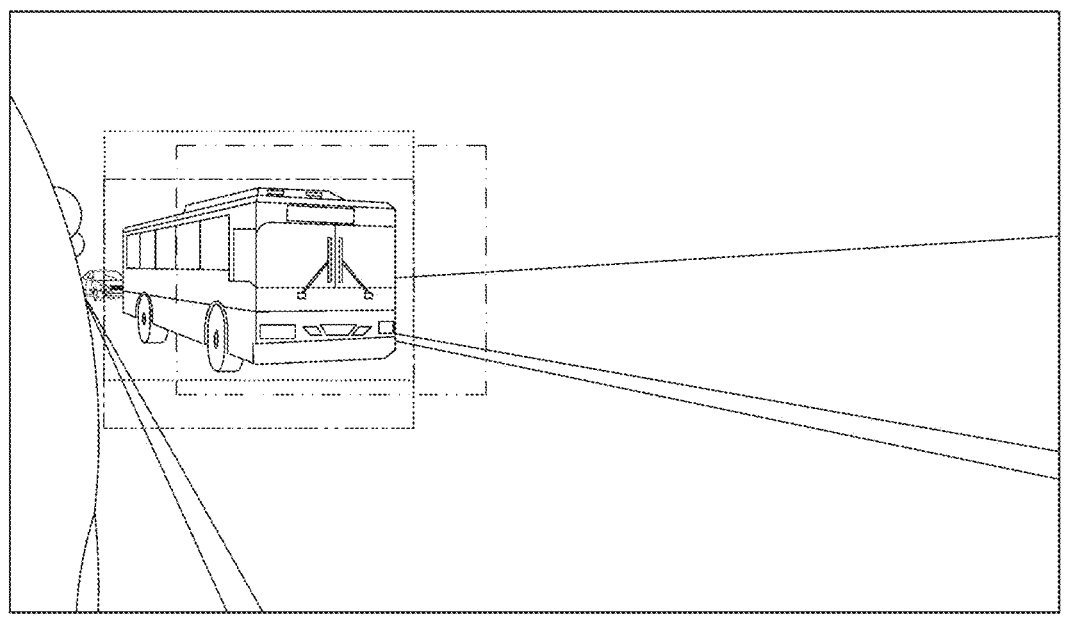
FIG. 13 is a diagram for describing an NMS result using three-dimensional information according to a comparative example.
Figure 13:
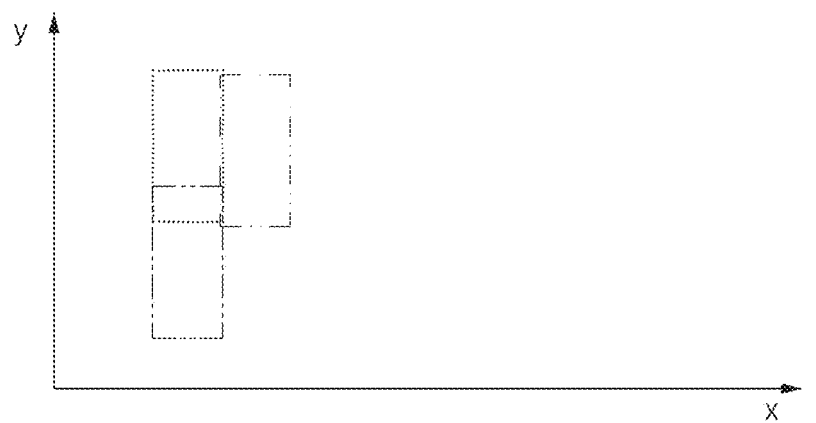

FIG. 13 is a diagram for describing an NMS result using three-dimensional information according to a comparative example.

Referring to FIG. 13, according to the NMS result according to the comparative example, when the depth value between the first bounding box Bbox 1, the second bounding box Bbox 2, and the third bounding box Bbox 3 is large, all of the first to third bounding boxes Bbox 1, Bbox 2, and Bbox 3 may be left. Therefore, the amount of computation of subsequent NMS procedures may be increased.

In contrast, since the embodiment of the present disclosure fuses two-dimensional information and three-dimensional information, accurate object estimation performance may be obtained. Also, computation efficiency may be increased compared to the conventional method of performing the NMS using three-dimensional information.

Figure 14:
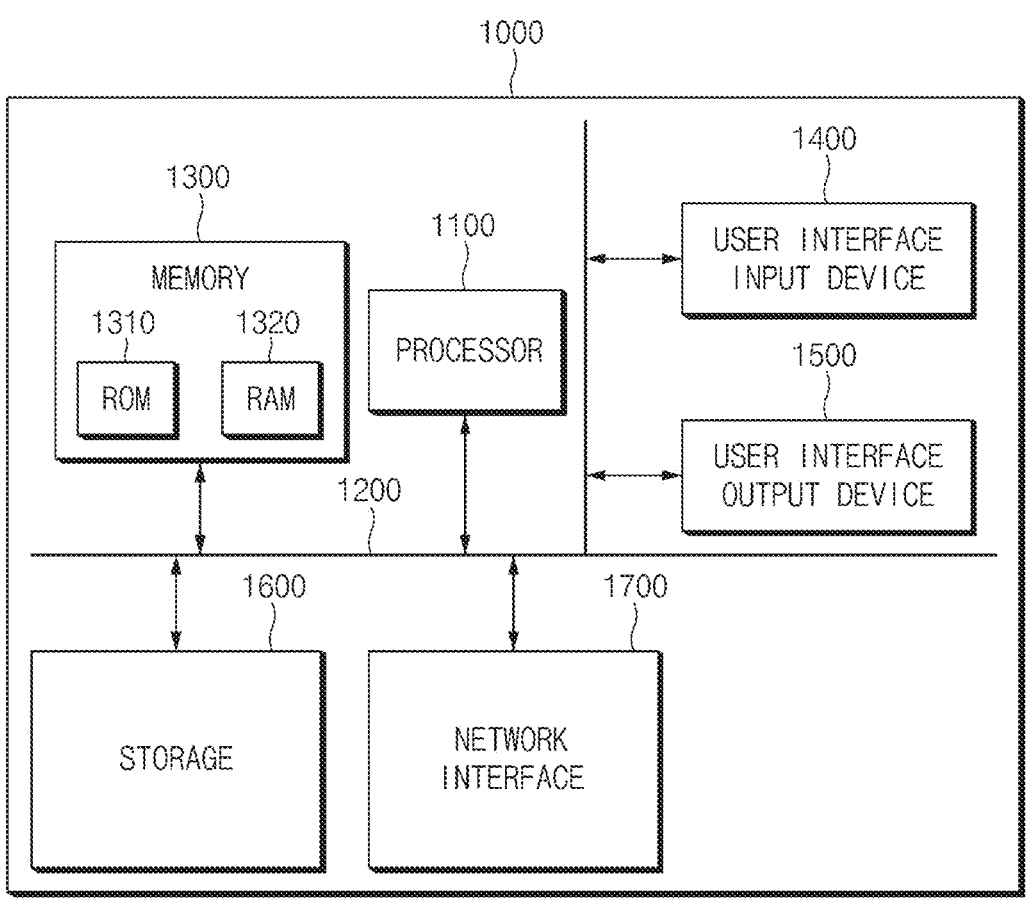
FIG. 14 is a diagram illustrating a computing system, according to an embodiment of the present disclosure.

FIG. 14 illustrates a computing system according to an embodiment of the present disclosure.

Referring to FIG. 14, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600), such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium as an example may be coupled to the processor 1100. The processor 1100 may read out information from the storage medium and may write information into the storage medium. In another embodiment, the storage medium may be integrated with the processor 1100. The processor and storage medium may be implemented with an application specific integrated circuit (ASIC). The ASIC may be provided in a user terminal. In another embodiment, the processor and storage medium may be implemented with separate components in the user terminal.

According to an embodiment of the present disclosure, object detection performance may be improved by fusing two-dimensional information and three-dimensional information.

In addition, according to an embodiment of the present disclosure, since only depth information is used as the three-dimensional information used to calculate the three-dimensional overlapping degree between bounding boxes, high accuracy may be obtained by utilizing three-dimensional information without requiring an excessive amount of computation.

In addition to this, various effects identified directly or indirectly through this specification may be provided.

The above description merely illustrates the technical idea of the present disclosure. Those of ordinary skill in the art to which the present disclosure pertains should be able to make various modifications and variations without departing from the essential characteristics of the present disclosure.

Therefore, embodiments of the present disclosure are not intended to limit the technical spirit of the present disclosure but are provided only for illustrative purposes. The scope of protection of the present disclosure should be construed by the attached claims, and all equivalents thereof should be construed as being included within the scope of the present disclosure.

What is claimed is:

1. An object detection apparatus comprising:
a sensor device configured to obtain an image; and
a processor configured to
obtain a first bounding box and a second bounding box based on a learning result of the image,
calculate a two-dimensional overlapping degree of between the first bounding box and the second bounding box,
calculate a depth deviation between the first bounding box and the second bounding box, and
perform a non-maximum suppression procedure based on a three-dimensional overlapping degree,
wherein the processor is further configured to:
obtain a normalization factor by calculating a difference between "1" and a normalized depth deviation; and
obtain the three-dimensional overlapping degree by performing a multiplication operation between the two-dimensional overlapping degree and the normalization factor.

2. The object detection apparatus of claim 1, wherein the processor is configured to select the first bounding box and the second bounding box within output values of a network using an anchor box corresponding to two or more vehicle sizes.

3. The object detection apparatus of claim 2, wherein the processor is configured to:
calculate the two-dimensional overlapping degree of between the first bounding box and the second bounding box;
determine a two-dimensional region of the first bounding box and a two-dimensional region of the second bounding box on an x-y plane of an input image; and
calculate an overlapping degree between the two-dimensional region of the first bounding box and the two-dimensional region of the second bounding box, and
wherein an x-axis of the x-y plane is perpendicular to a traveling direction of a vehicle on a road surface, and
wherein a y-axis of the x-y plane is an axis perpendicular to the road surface.

4. The object detection apparatus of claim 3, wherein the processor is configured to obtain the depth deviation by calculating a difference in coordinate values on a z-axis between a reference point of the first bounding box and a reference point of the second bounding box on a bird's eye view of the image including the z-axis perpendicular to the x-y plane.

5. The object detection apparatus of claim 4, wherein the processor is configured to calculate the three-dimensional overlapping degree based on an absolute value of the depth deviation.

6. The object detection apparatus of claim 5, wherein the processor is configured to normalize the depth deviation within a range greater than 0 and less than 1, based on a ratio of the depth deviation to a maximum deviation of a depth value.

7. The object detection apparatus of claim 6, wherein the processor is configured to:
calculate an average depth value for each type of the anchor box; and obtain a maximum deviation of the depth value by calculating a difference between a maximum value of the average depth value and a minimum value of the average depth value.

8. The object detection apparatus of claim 6, wherein the processor is configured to set a size of the three-dimensional overlapping degree to be small in inverse proportion to the depth deviation.

9. The object detection apparatus of claim 1, wherein the processor is configured to exclude a bounding box having a low confidence among the first bounding box and the second bounding box from an object candidate group when the three-dimensional overlapping degree is equal to or greater than a preset threshold value.

10. An object detection method comprising:
obtaining a first bounding box and a second bounding box based on a learning result of an input image;
calculating a two-dimensional overlapping degree between the first bounding box and the second bounding box;
calculating a depth deviation between the first bounding box and the second bounding box; and
performing a non-maximum suppression procedure based on a three-dimensional overlapping degree,
wherein calculating the three-dimensional overlapping degree includes:
obtaining a normalization factor by calculating a difference between "1" and a normalized depth deviation; and
obtaining the three-dimensional overlapping degree by performing a multiplication operation between the two-dimensional overlapping degree and the normalization factor.

11. The object detection method of claim 10, wherein obtaining the first bounding box and the second bounding box includes selecting a pair of bounding boxes within output values of a network using an anchor box corresponding to two or more vehicle sizes.

12. The object detection method of claim 11, wherein
the input image includes a plane defined by an x-axis and a y-axis;
calculating the two-dimensional overlapping degree between the first bounding box and the second bounding box includes
determining a two-dimensional region of the first bounding box and a two-dimensional region of the second bounding box on an x-y plane, and calculating an overlapping degree between the two-dimensional region of the first bounding box and the two-dimensional region of the second bounding box;
the x-axis of the x-y plane is perpendicular to a traveling direction of a vehicle on a road surface; and
the y-axis of the x-y plane is an axis perpendicular to the road surface.

13. The object detection method of claim 12, wherein
calculating the depth deviation includes obtaining the depth deviation by calculating a difference in coordinate values on a z-axis between a reference point of the first bounding box and a reference point of the second bounding box on a bird's eye view of the input image, and
the z-axis is perpendicular to the x-y plane.

14. The object detection method of claim 13, wherein obtaining the depth deviation further includes obtaining an absolute value of the depth deviation.

15. The object detection method of claim 14, wherein obtaining the depth deviation further includes normalizing the depth deviation within a range greater than 0 and less than 1, based on a ratio of the depth deviation to a maximum deviation of a depth value.

16. The object detection method of claim 15, wherein obtaining the depth deviation further includes:
calculating an average depth value for each of types of the anchor box; and
obtaining a maximum deviation of the depth value by calculating a difference between a maximum value of the average depth value and a minimum value of the average depth value.

17. The object detection method of claim 15, wherein calculating the three-dimensional overlapping degree includes setting a size of the three-dimensional overlapping degree to be small in inverse proportion to the depth deviation.

18. The object detection method of claim 10, wherein performing the non-maximum suppression procedure includes excluding a bounding box having a low confidence among the first bounding box and the second bounding box from an object candidate group when the three-dimensional overlapping degree is equal to or greater than a preset threshold value.

* * * * *